(No Model.)
J. H. HICKS.
COTTON PLANTER AND CULTIVATOR.
No. 275,651. Patented Apr. 10, 1883.
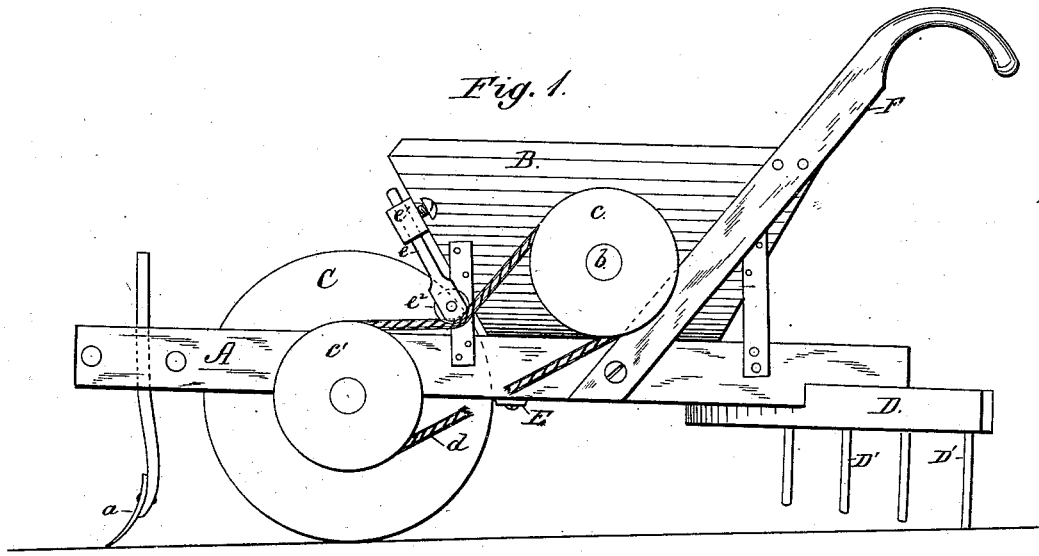
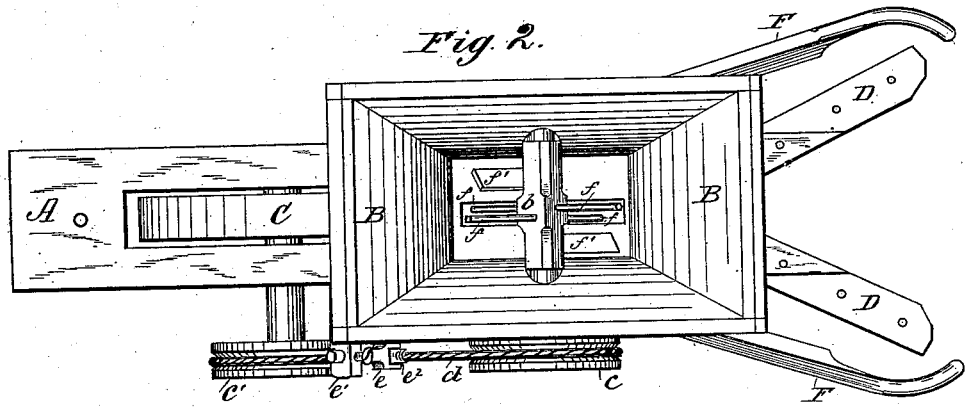
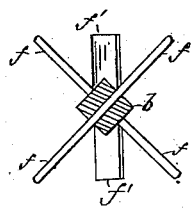
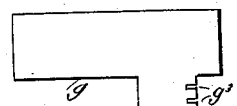
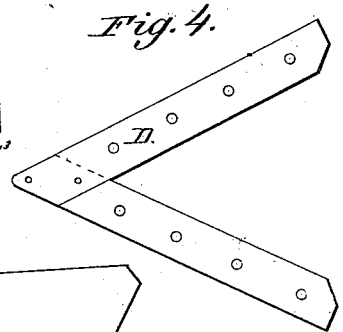
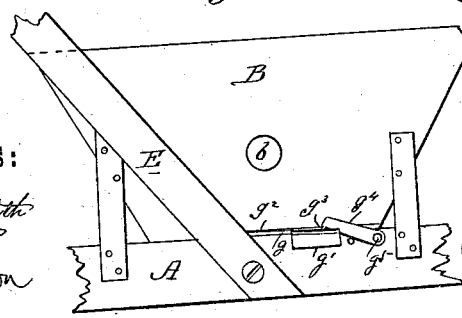
WITNESSES:
W. W. Hollingsworth
Solon C. Kemon
INVENTOR:
John H. Hicks
BY
ATTORNEYS.

UNITED STATES PATENT OFFICE.

JOHN H. HICKS, OF GADSDEN, ALABAMA.

COTTON PLANTER AND CULTIVATOR.

SPECIFICATION forming part of Letters Patent No. 275,651, dated April 10, 1883.

Application filed August 19, 1882. (No model.)

*To all whom it may concern:*

Be it known that I, JOHN H. HICKS, of Gadsden, in the county of Etowah and State of Alabama, have invented a new and Improved Cotton Planter and Cultivator; and I do hereby declare that the following is a full, clear, and exact description of the same, reference being had to the accompanying drawings, forming part of this specification.

This invention relates to an improved cotton planter and cultivator, having for its object principally to cause the feeding of the seed centrally from the hopper and in a thin continuous stream to the furrow; secondly, to enable the teeth of the coverer or harrow to conform to the slope of the seed-bed, and thus more effectually clean it; and, further, to allow the machine to be used either as a planter or cultivator.

The invention consists in the employment, in the seed-box or hopper, of a shaft having centrally-arranged radial teeth, and blades or wings disposed upon opposite sides, and one near each end thereof, and having their faces arranged obliquely to the longitudinal axis of said shaft.

It consists also of the coverer or harrow having its teeth arranged in such a manner as to conform to the slope of the seed-bed while cleaning the same, substantially as hereinafter more fully set forth.

In the accompanying drawings, Figure 1 is a side view of my improved cotton planter and cultivator. Fig. 2 is a plan view thereof; and Figs. 3, 4, and 5 are detail views, respectively, of the seed-shaft with teeth and blades, the harrow or coverer, showing the arrangement of its teeth, and the seed-box with its adjuncts. Fig. 6 is a detailed plan view of the seed-opening slide.

In carrying out my invention I employ a horizontal frame, A, upon which is mounted the seed box or hopper B, and within the forward end of which is hung the broad-faced driving-wheel C. Depending also from the same end of frame A is the furrow-opening plow or shovel $a$, arranged directly in front of the wheel C. Within the hopper B is hung the seed-shaft $b$, one end passing through one side of said hopper, and having a pulley, $c$, by means of which and a second pulley, $c'$, encompassed by an endless belt or band, $d$, the said shaft is driven. The belt is held under tension by an arm, $e$, depending from and adjustable in a bar or bracket, $e'$, fastened to the hopper, said arm having a pulley, $e^2$, bearing on the belt. This shaft has a number of centrally-arranged radial teeth, $f$, adapted to act upon and pass the seed through the seed-opening in the bottom of the hopper in a thin continuous stream to the ground or furrow. This shaft is also provided with radial blades or wings $f' f'$, arranged on directly opposite sides, and one near each end of the said shaft, with their faces inclined or disposed obliquely to the longitudinal axis or plane of the shaft. The purpose of this arrangement of blades or wings is to cause the feeding of the seed in the hopper toward the central seed-opening of the hopper for the action of the radial teeth $f$, above described.

$g$ is a slide or cover for closing the seed-opening when desired, said slide arranged to move under the seed-hopper bottom in line with said opening, and having a handle or bent arm, $g'$, reaching out through a slot, $g^2$, between the bottom of the seed-hopper and the frame A and from one side of the hopper. The arm or handle $g'$ of the slide or cover $g$ has notches or slits $g^3$, which receive a gravity-catch, $g^4$, hung on the frame A and supported on a stud, $g^5$, on the said frame when engaged with the slide. As I do not confine myself to this form of slide and catch, they may be replaced by any other construction of slide and holding device adapted to serve the same purpose.

D is the harrow or coverer, constructed of two toothed bars arranged in a V shape, which are preferably mortised into the rear ends of the bars of the frame A and removably connected thereto by screws or otherwise to allow the removal of the harrow when it is desired to use the machine for cultivating the plants. The teeth D' of the V-shaped frame or bars D are so arranged or constructed that each tooth of each of the two series fastened to the said bars shortens or decreases in length toward their point of convergence, as clearly shown in Fig. 1. This arrangement of the teeth, taken in connection with the V-shaped frame D, causes the teeth to conform to the shape of the seed-bed, whereby they are enabled to more effectually clean the latter, while at the same time covering the seed with loose earth. Affixed to the under side and crosswise of the side bars of the frame A, contiguous to the wheel C, is a scraper, E, to prevent the latter clogging by reason of adhering dirt. The broad-faced wheel C acts to crush or comminute clods during the operation of planting the seed to allow them to properly enter the ground.

F F are the handles for guiding the machine, affixed to the sides of the frame A and hopper B.

By means of this machine the operation of planting or cultivation can be performed close up to the inclosure or fence by pushing it to said point.

Having thus described my invention, what I claim as new is—

In a cotton planter and cultivator, the combination, with the hopper B and frame A, of the seed-opening slide $g$, having an arm, $g'$, arranged at one side and at one end thereof, said arm having notches $g^3$ and a bent-downward or right-angled projection, and the gravity-catch $g^4$, supported on a stud, $g^5$, and adapted to engage the notches $g^3$ of the slide, whereby the size of the seed-opening is regulated or varied, substantially as shown and described.

JOHN H. HICKS.

Witnesses:
JAMES T. BROOKS,
ISRAEL CRUMP.